United States Patent

[11] 3,634,721

[72] Inventors Saburo Ito;
 Shingo Ezaki, both of Otsu, Japan
[21] Appl. No. 11,037
[22] Filed Feb. 13, 1970
[45] Patented Jan. 11, 1972
[73] Assignee New Nippon Electric Company Ltd.
 Osaka, Japan

[54] METAL HALIDE DISCHARGE LAMPS
 1 Claim, 3 Drawing Figs.
[52] U.S. Cl............................................. 313/225,
 313/184, 313/223, 313/229
[51] Int. Cl........................................... H01j 61/18
[50] Field of Search........................................ 313/184,
 223, 225, 229

[56] References Cited
 UNITED STATES PATENTS
 2,803,775 8/1957 Jaumann et al.............. 313/223 X
 3,259,777 7/1966 Fridrich....................... 313/229 X
 3,234,421 2/1966 Reiling......................... 313/229 X

*Primary Examiner* — Raymond F. Hossfeld
*Attorneys* — Norman J. O'Malley and Owen J. Meegan ABSTRACT: A metal halide discharge lamp which emits all visible colors in the spectrum and contains a fill including mercury, halogen and light emitting metals of cobalt and/or palladium. The lamp is an efficient producer of red and blue light appropriate for the growth of the plants.

3,634,721

METAL HALIDE DISCHARGE LAMPS

BACKGROUND OF THE INVENTION

1. Field of the Invention

This invention relates to high-pressure electric discharge lamps, and more particularly to those containing atoms of mercury, halogen (except chlorine and fluorine) and cobalt and/or palladium.

2. Description of the Prior Art

Generally speaking, the light in the blue range from 400 to 500 nm. wavelength and the light in the red range from 600 to 700 nm. wavelength contribute much to the photosynthesis of chlorophyll in plants, and the light in a range from 500 to 600 nm. wavelength of green color contributes very little to the same photosynthesis. Furthermore, it is known that ultraviolet rays of less than 350 nm. wavelength tend to cause cell cleavage and are harmful in the growth of the plants. It is further known that when infrared rays of 700 to 800 nm. are irradiated on the plants together with lights of 400 to 500 nm. and also of 600 to 700 nm., the photosynthesis of the chlorophyll is promoted.

Accordingly, for utilizing the above-described characteristic and for promoting the growth of plants, a low-pressure mercury vapor discharge lamp having light emission in the red and blue ranges has been used. Alternatively, low-pressure or high-pressure mercury vapor discharge lamps having double coatings or mixed coatings of red and blue fluorescent substances have been used to adapt to the photosynthetic characteristics of chlorophyll.

Although these types of lamps have had nearly acceptable spectral energy distribution characteristics, the light output of low-pressure mercury discharge lamps was not sufficient. The high-pressure mercury vapor discharge lamp having a fluorescent coating on the inside surface of the outer envelope of the lamp to supplement the red light component had very strong emissions of the mercury spectra of 546.1, 577.0 and 579.0 mm. wavelength. The effective component of light for the growth of the plant, however, was reduced despite the comparatively large light output, because much of the visible light which might have advantageous effects on the plant growth was absorbed by the fluorescent coating.

Therefore, the primary object of the present invention is to provide a novel type of discharge lamp wherein the line spectra produced by the added metals or regenerating spectra due to the fluorescent materials are not utilized, but instead a continuous spectrum, in the visible light range, based on a quite novel principle is employed. This discharge lamp can be advantageously used both for plant growth and general illumination purposes.

SUMMARY OF THE INVENTION

We have discovered that when cobalt and/or palladium atoms are added to the fill of the high-pressure discharge lamp as light-emitting metals, together with mercury and halogen (except chlorine and fluorine) atom, the light produced by the device has an improved continuous spectrum covering the whole visible range which is advantageous for the growth of the plants.

In accordance with the present invention the advantageous effects of a cobalt can be realized through it incorporation in an arc tube, when the wall temperature thereof is maintained in a range of 540° to 800° C. When the tube temperature was in a range of 400° to 520° C. it was found that line spectra of cobalt; 430.5, 341.2, 345.4, 346.6, 350.2, 353.0, 365.0, 399.5, 404.7, 411.9, 412.1, 435.8 nm. were emitted together with the line spectra for mercury (Hg). The absorption of the line spectra for the cobalt and mercury began at the tube temperature of approximately 540° C. or more, and also that a continuous spectrum covering the whole visible range, which was advantageous for growth of plants, was obtained.

The reason of the above-described phenomenon may be explained as follows. The ultraviolet radiation produced by mercury and line spectrum caused by cobalt are absorbed by the vapor of such as cobalt iodide. This absorbed light energy causes reemission of light having a continuous spectrum distribution throughout the visible range. It may be said that this mechanism for the light emission is completely different from those in the conventional discharge lamps where the atomic luminous mechanism was considered. Similar phenomenon was observed also for palladium.

At tube temperatures more than about 800° to 810° C., light absorption occurs also in the visible range, and the reemission band is extended to the infrared portion of the spectrum. In those cases, the light energy distribution which is helpful for plant growth (some amount of infrared ray is advantageous to the growth of plants) cannot be obtained.

Furthermore, it has been found that discharge lamps of this type can also be employed as light sources for the general illumination when other light-emitting metals such as aluminum, scandium, thorium or thallium are added in the range from $1.1 \times 10^{-7}$ to $1.9 \times 10^{-5}$ gram atoms per cubic centimeter of the arc tube.

The discharge lamps of the present invention should contain certain quantities of materials. Specifically, we prefer to add cobalt in quantities of $8.5 \times 10^{-7}$ to $4.2 \times 10^{-5}$ gram atoms (preferably from $2.6 \times 10^{-6}$ to $2.6 \times 10^{-5}$ gram atoms) and/or palladium in quantities of $1.9 \times 10^{-6}$ to $1.4 \times 10^{-4}$ gram atoms (preferably from $5.6 \times 10^{-6}$ to $5.6 \times 10^{-5}$ gram atoms) per cubic centimeter of the arc tube. Also, added are the required amounts of mercury, halogen and an inert gas. The tube temperature (during operation) is maintained in a range from 540° to 800° C.

It has been further found that if the added amounts of either cobalt and palladium (or both) exceed the above-described upper limits, the excessive amount of these materials will be deposited on the inside surface of the arc tube, and the light is absorbed by the deposit. Excessive materials also tend to cause unstable arc conditions and the wall temperature of the arc tube can become considerably higher that that which is desired. When the added amounts are less than the lower limits, the above-mentioned reemission of light is minimized because of the self-absorption, and the line spectra of the cobalt, palladium and mercury are intesified, thus making it impossible to obtain above mentioned continuous spectrum or a white light which will enhance the plane growth. Parenthetically, the amount of halogen preferably iodine and/or bromine may be somewhat decreased or increased from the stoichiometric amount employed for producing cobaltous iodide, palladium iodide, cobaltous bromide or palladium bromide.

A discharge lamp-containing cobaltous chloride, mercuric iodide has been proposed and it has been alleged that a continuous spectrum is obtained within a range of 340 to 450 nm. However, in this type of discharge lamp, because chlorine is more active than iodine, there is no possibility of producing cobaltous iodide, and for this reason no continuous spectrum covering the whole visible range can be obtained. On the other hand, cobalt or palladium in the form of iodide or bromide can achieve such a spectrum.

DESCRIPTION OF THE PREFERRED EMBODIMENT

In accordance with the present invention, an arc tube was made having an inside diameter of 10 mm., an arc length of 10 mm., and an inner volume of 1.2 cc. The filling materials or additives used in the lamp are listed up in table I. The test results of this arc tube of discharge lamp were as indicated in table II, and found to be suitable to the growth of the plants.

TABLE I

| Sample Additives |  | I | II |
| --- | --- | --- | --- |
| Hg | (mg.) | 12 | — |
| Co | (mg.) | 0.24 | — |
| Pd | (mg.) | — | 5.4 |
| HgI$_2$ | (mg.) | 2.2 | 23.1 |
| Air pressure | (mm. Hg) | 100 | 100 |

TABLE II

Figure 1:
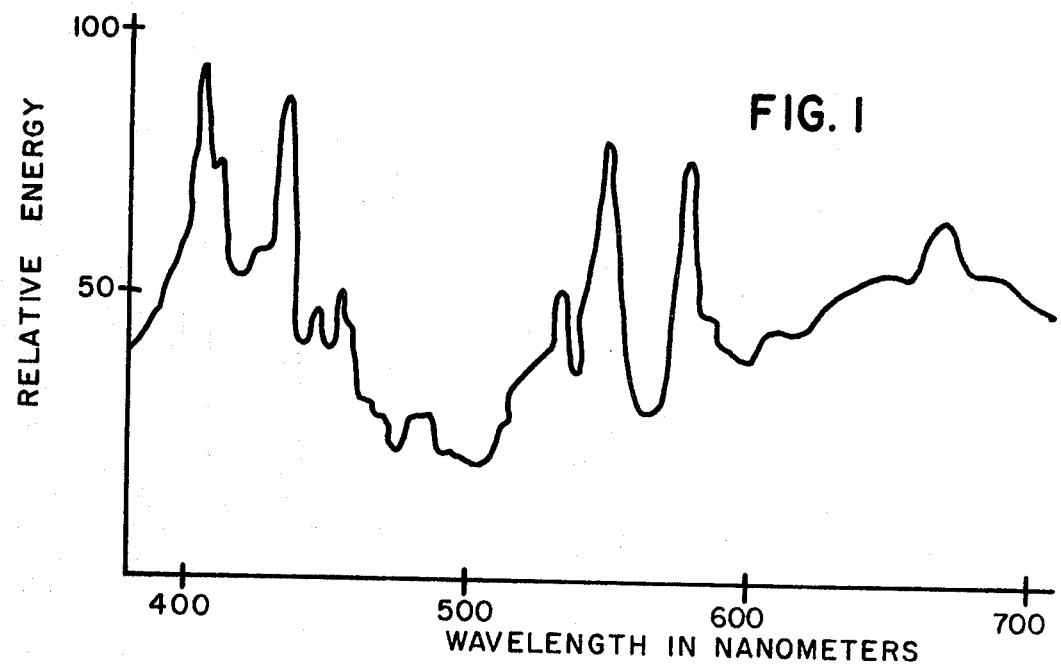
FIG. 1 is a graph showing a spectral energy distribution for the discharge lamp containing cobalt in accordance with this invention.
Figure 2:
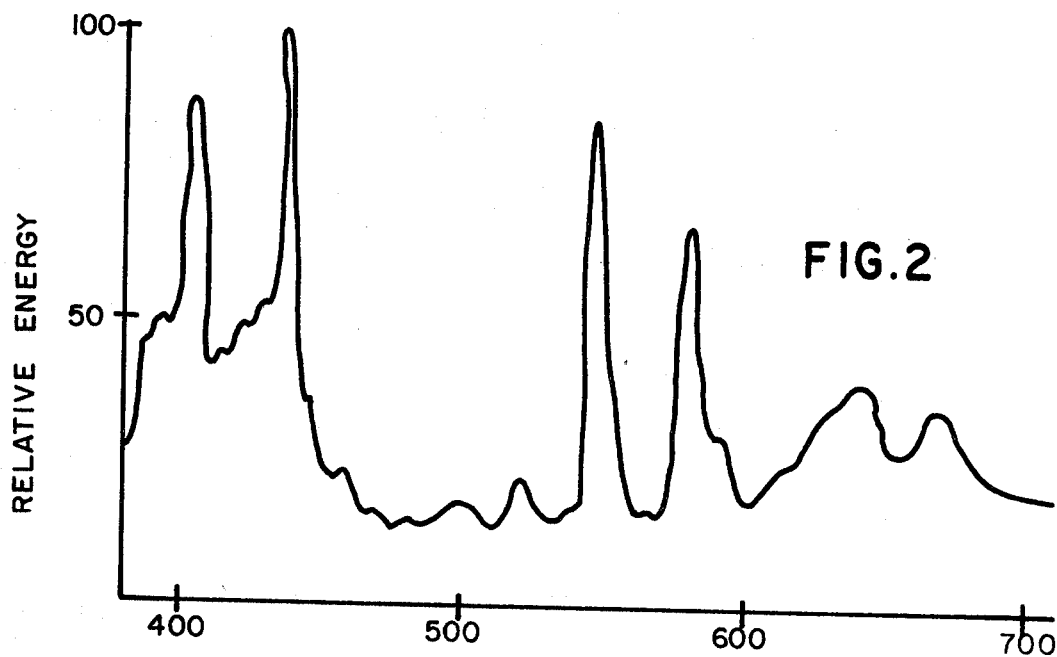
FIG. 2 is a graph showing a spectral energy distribution for the discharge lamp-containing palladium of another embodiment.

| Samples | Input (.w) | Total fluxes of light (lm.) | Chromatic temperature (° K.) | Ra | Energy Distribution of spectrum | Wall temperature (° C.) |
| --- | --- | --- | --- | --- | --- | --- |
| 1 | 300 | 9,500 | 5,800 | 78 | Fig. 1 | 600 |
| 2 | 200 | 6,800 | 4,500 | 65 |  | 586 |
| 2 | 300 | 11,500 | 4,200 | 71 | Fig. 2 | 660 |

In the above-described examples, the spectrum components in a range of 500 to 600 nm. are few, as is apparent from FIGS. 1 and 2, in comparison with components in other range, and hence are not truly suitable for general lighting purposes. The light, however, can be advantageously employed for promotion of growth in plants.

General purpose illumination can be achieved wither by elevating the input power (wall temperature) or by elevating the inside pressure of the discharge lamp. Alternatively, the emission can be change by adding at least one metal selected from the group of aluminum, scandium, thorium and thallium in the range approximately from $1.1 \times 10^{-7}$ to $1.9 \times 10^{-5}$ gram atoms per cubic centimeter of the arc tube. Through these modifications, good general color rendering value and efficiencies can be obtained. For example, in a high-pressure type discharge lamp, an efficiency of as high as 60 lm./w. and a general color rendering index (Ra) or more than 85 can be obtained.

Figure 3:
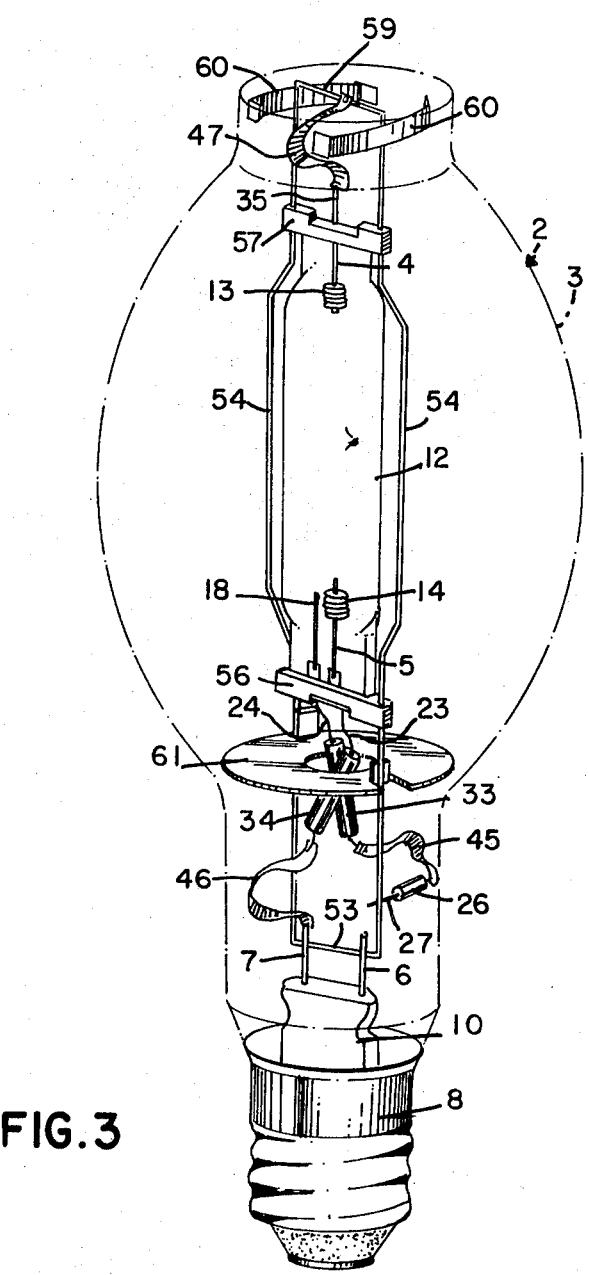
FIG. 3 is a perspective view of a lamp containing the following materials according to the present invention.

Referring to FIG. 3, an elevational view of a high-pressure electric discharge device is shown. For clarity of presentation, the outer bulbous envelope and the base of the lamp are shown in phantom lines surrounding the arc tube harness and the arc tube. The device such as shown in the drawing, comprises an outer vitreous envelope or jacket 2 of generally tubular form having a central bulbous portion 3. The jacket is provided at its end with a reentrant stem having a press seal through which extend relatively stiff lead-in wires 6 and 7 connected at their outer ends to the electrical contacts of the usual screw-type base 8 and at their inner ends to the arc tube and the harness.

The arc tube is generally made of quartz although other tubes of glass may be used such as alumina glass or Vycor, the latter being a glass of substantially pure silica. Sealed in the arc tube 12, at the opposite ends thereof are main discharge electrodes 13 and 14 which are supported on lead-in wires 4 and 5 respectively. Each main electrode comprises a core portion which may be a prolongation of the lead-in wires 4 and 5 and may be prepared of a suitable metal such as for example molybdenum or tungsten. The prolongations on these lead-in wires 4 and 5 can be surrounded by molybdenum or tungsten wires helixes.

An auxiliary starting probe or electrode 18, generally prepared of tantalum or tungsten is provided at the base end of the arc tube 12 adjacent the main electrode the main electrode 14 and comprises an inwardly projecting end of another lead-in wire.

Each of the current lead-in wires described have their ends welded to intermediate foil sections of molybdenum which are hermetically sealed within the pinched sealed portions of the arc tube. The foil sections are very thin, for example approximately 0.0008 inch thick and go into tension without rupturing or scaling off when the heated arc tube cools. Relatively short molybdenum wires 23, 24 and 25 are welded in the outer ends of the foil and serve to convey current to the various electrodes inside the arc tube 12.

Metal strips 45 and 46 are welded onto the lead-in wires 23 and 24 respectively. A resistor 26 is welded to foil strips 45 which in turn is welded to the arc tube harness. The resistor may have a value of for example 40,000 ohms and serves to limit current to auxiliary electrode 18 during normal starting of the lamp. Metal foil strip 46 is welded at one end to a piece of molybdenum foil sealed in the arc tube 12 which in turn is welded to main electrodes 13 and 14. Metal foil strip 47 is welded to one end of the lead-in 35 and at the other end to the harness. The pinches or flattened end portion of the arc tube 12 form a seal which can be of any desired width and can be made by flattening or compressing the ends of the arc tube 12 while they are heated.

A U-shaped internal wire supporting assembly or arc tube harness serves to maintain the position of the arc tube 12 substantially coaxially within the envelope 2. To support the arc tube 12 within the envelope, stiff lead-in wire 6 is welded to the base 53 of the harness. Because stiff lead-in wires 6 and 7 are connected to opposite sides of a powerline, they must be insulated from each other, together with all members associated with each of them. Clamps 56 and 57 hold the arc tube 12 at the end portions and are fixedly attached to legs 54 of the harness. A rod 57 bridges the free ends of the U-shaped support wire 54 and is fixedly attached thereto for imparting stability to the structure. The free ends of the U-shaped wire 54 are also provided with a pair of metal springs 60, frictionally engaging the upper tubular portion of the lamp envelope 2. A heat shield 61 is disposed beneath the arc tube 12 and above the resistor 26 to protect the resistor from any excessive heat generated during lamp operation.

As described above, according to the present invention, either cobaltous halide or palladium halide in included in the arc tube. The wall temperature thereof at the time of operation is maintained in a range from 540° to 800° C. A continuous spectrum is produced which may be used for both plane growth and general lighting.

As our invention, we claim:

1. A metal halide discharge lamp which is an efficient producer of red and blue light appropriate for plant growth characterized in an arc tube having spaced electrodes therein containing a light-emitting metal selected from the group consisting of cobalt in an amount of $8.5 \times 10^{-7}$ to $4.2 \times 10^{-5}$ gram atoms and palladium in an amount of $1.9 \times 10^{-6}$ to $1.4 \times 10^{-4}$ gram atoms per cc of arc tube volume together with required amount of mercury halogen selected from the group consisting of iodine and bromine, and an inert gas, wherein the wall temperature of the arc tube during operation is maintained in a range from 540° to 800° C.

* * * * *